United States Patent [19]

Werner

[11] 4,304,088
[45] Dec. 8, 1981

[54] ROTARY MOWER WITH END-TO-END CONNECTED BLADE-CARRIER SUPPORTS

[75] Inventor: Anton Werner, Saverne, France

[73] Assignee: Kuhn S.A., Saverne, France

[21] Appl. No.: 147,533

[22] Filed: May 7, 1980

[30] Foreign Application Priority Data

May 16, 1979 [FR] France .................. 79 12929

[51] Int. Cl.³ ............................ A01D 35/264
[52] U.S. Cl. .................................. 56/13.6
[58] Field of Search .......... 56/13.6, 6, 295, 192, 56/16.2, DIG. 10

[56] References Cited

U.S. PATENT DOCUMENTS

| | | | |
|---|---|---|---|
| 3,040,502 | 6/1962 | Smith et al. | 56/13.6 |
| 3,236,034 | 2/1966 | Blettner | 56/6 |
| 3,683,601 | 8/1972 | van der Lely | 56/6 |
| 4,048,790 | 9/1977 | Zweeger | 56/13.6 |

FOREIGN PATENT DOCUMENTS

| | | | |
|---|---|---|---|
| 1582353 | 8/1970 | Fed. Rep. of Germany | 56/6 |
| 1253441 | 11/1971 | United Kingdom | 56/13.6 |

*Primary Examiner*—Jay N. Eskovitz
*Attorney, Agent, or Firm*—Ernest F. Marmorek

[57] ABSTRACT

A rotary mower includes first and second supports extending in a predetermined direction and connected to one another end-to-end, and a set of elongated blade carriers rotatably mounted on each support. Each blade carrier, upon rotation, defines a trajectory, and neighboring blade carriers on opposite supports are mounted so that their trajectories do not overlap. First and second drive units are provided to drive each set of elongated blade carriers, respectively.

11 Claims, 5 Drawing Figures

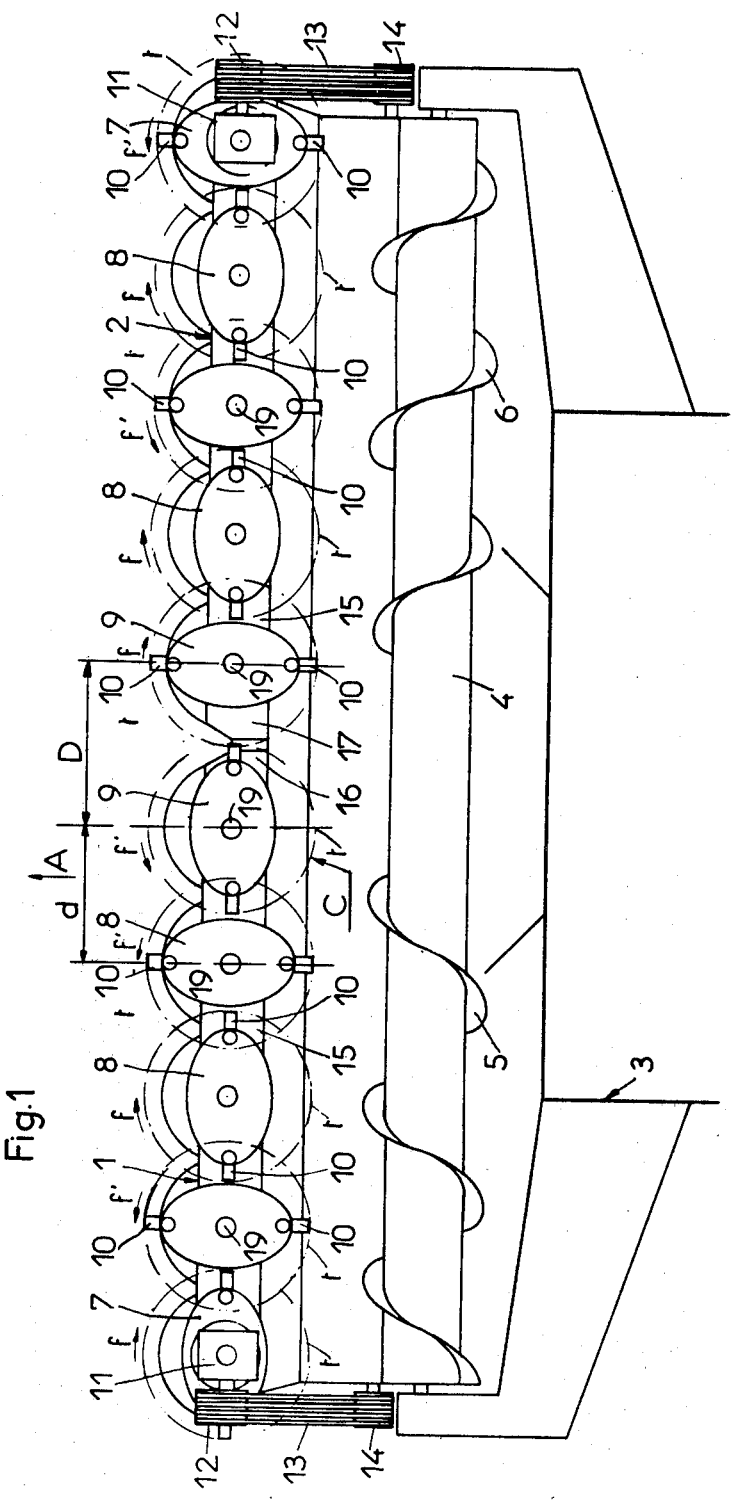

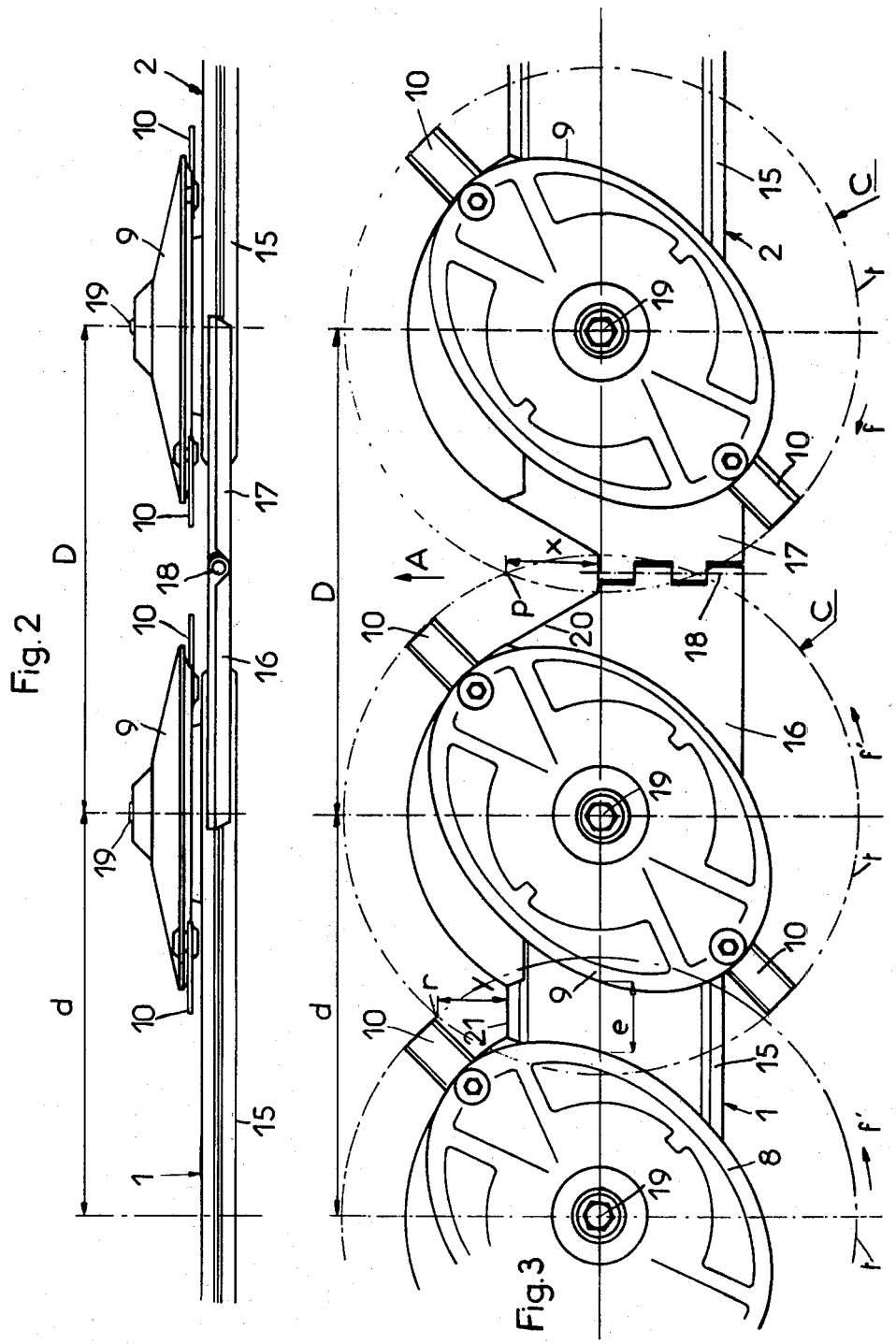

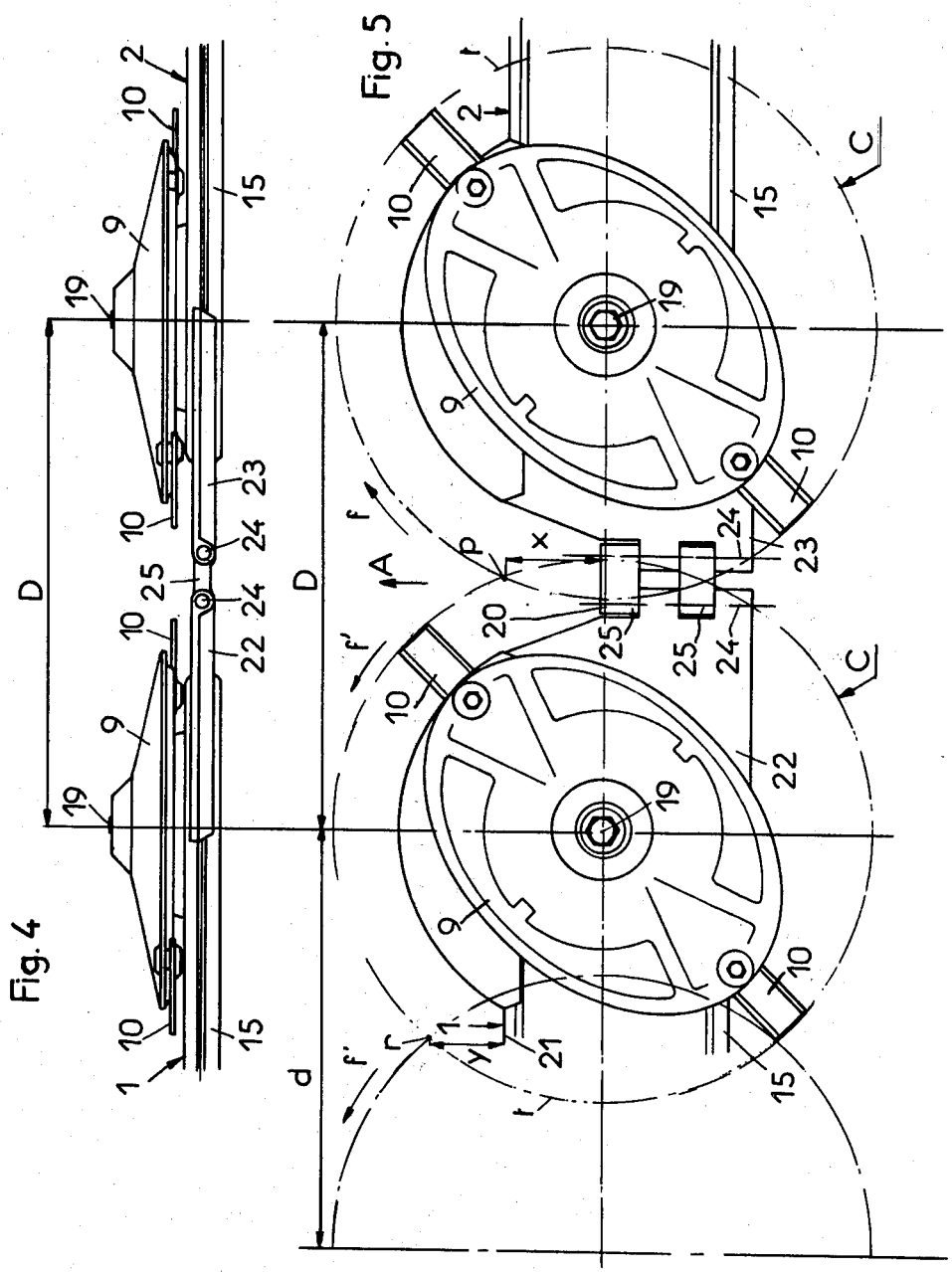

ROTARY MOWER WITH END-TO-END CONNECTED BLADE-CARRIER SUPPORTS

BACKGROUND OF THE INVENTION

The present invention relates to a rotary mower of the type which has two supports or cutter bars connected to one another, and fitted with a set of rotary blade carriers of an oval shape or the like, which are driven by gear trains disposed therebelow.

The cutting width of this type of mower is generally restricted to seven or eight rotary blade carriers fitted onto a support or cutter bar which is formed in a single piece. This is due in particular to the fact that it is difficult to transmit a significant amount of power from one end of a support or cutter bar, in view of the small volume allotted to the transmission units, which are housed below the rotary blade carriers. Moreover, the smaller the length of the support or cutter bar, the more easily is it able to follow any unevenness of the terrain.

Consequently, when it is desired to produce a rotary mower, which has more than eight rotary blade carriers, for example, in the form of discs, it is advantageous to arrange several supports or cutter bars in an end-to-end manner. When this arrangement is adopted, it is preferable to drive the blade carriers of each support or cutter bar separately, preferably on one end of each support, by means of flexible drive devices, such as belts. The belts, which may be either notched or smooth are, in fact, likely to slip in the event of any excess loads, thereby protecting the drive devices.

Since a machine of the type described above is required to cut crops uniformly over its whole cutting width, care should be taken to ensure that no portions or strips of the crop are left uncut, especially in the region between two supports or cutter bars connected to one another end-to-end. Consequently, two neighboring supports or cutter bars have to be connected by arranging them quite close to one another. However, since the cutting unit supports or blade carriers of each bar are driven by means of belts, and since, in certain parts of their trajectory, the oval-shaped blade carriers are offset by 90° in relation to one another along the whole width of the machine, which is formed by an assembly of the supports or bars, the blade carriers of one bar or another may become blocked when encountering an obstacle such as, for example, a boundary post in a field. The belts which drive the blade carriers of each support or bar are able to absorb such blocking. However, if the blade carriers of a support or cutter bar are blocked, the relative angular position of one set of blade carriers is altered in relation to the angular position of the set of blade carriers of the neighboring support or cutter bar. This means, that, at certain points in their trajectory, the major axis of the ovally-shaped blade carriers of one support or cutter bar are no longer offset by 90° in relation to the major axis of the ovally-shaped blade carriers of the neighboring support or cutter bar.

Moreover, if the distance between all the shafts of the blade carriers is constant over the whole width of the machine, and since the blade carriers are oval in shape, neighboring blade carriers of different cutter bars or supports may collide. Such a collision may not only damage the blade carriers, but also the bearings onto which they are fitted, thus possibly necessitating time-consuming and costly repairs and, in any event, a prolonged period of idleness of the machine.

SUMMARY OF THE INVENTION

One of the principal objects of the invention is to obviate the aforecited disadvantages in a rotary mower of the aforedescribed type, while ensuring cutting of the crop without there being formed any uncut strips of forage between the various supports or cutter bars.

The rotary mower, according to the present invention, includes therefore first and second elongated supports extending in a predetermined direction, and facing each other end-to-end, a set of substantially oval-shaped blade carriers rotatably mounted on each support about an axis, the blade carriers substantially defining a cutting plane, and the axes being substantially disposed at right angles to the cutting plane; two neighboring axes on the same support are separated by a first spacing, two neighboring axes on opposite supports are separated by a second spacing, first and second drive means are disposed below the cutting plane, and operable to drive each set of elongated blade carriers, respectively, and coupling means disposed below the cutting plane connect the supports to one another, so that the second spacing is greater than the first spacing.

Each blade carrier is advantageously adapted to hold at least one blade, and defines an operative cutting diameter therewith, and the second spacing is advantageously made smaller than the operative cutting diameter. This feature prevents the formation of any strips of unmown crops between the supports or cutter bars.

In a preferred embodiment the coupling means has a front edge, as seen in the direction of forward movement of the mower, and the front edge is disposed substantially at right angles to the direction of forward movement, and each blade carrier is adapted to hold a blade, and defines an operative cutting diameter therewith; two neighboring blade carriers disposed on opposite supports define a first point of intersection of their cutting diameters forwardly of the front edge, and each support has a forward edge as seen in the direction of forward movement of the mower, and two neighboring blade carriers disposed on the same support define a second point of intersection of their cutting diameters forwardly of the forward edge; the distance between the first point of intersection and the front edge is preferably similar to the distance between the second point of intersection and the forward edge.

In order to cope effectively with uneven ground, it is advantageous to connect the supports flexibly, or to provide at least one shaft disposed in the direction of forward movement of the mower; the coupling means preferably include first and second members integral with the first and second supports, respectively, and hingeably connected to the shaft.

In an alternate embodiment first and second shafts are disposed parallel to one another in the direction of forward movement of the mower, and the coupling means include at least one connecting unit hingeably connected to the first and second shafts.

This feature permits the supports or cutter bars to operate parallel to one another on different planes.

Since the hinged shaft or shafts of the supports or cutter bars are located below the blade carriers' plane of cutting, the space located above the plane of cutting in the area of the hinges is consequently freely available, and blocking of the crop cut does not take place. Thus the blade carriers may be made to rotate either so as to create a converging movement, as seen by the crop at the front of the machine in the area of the hinges, or to create a diverging movement in the same area. In fact, it is found in practice that in disc mowers which have drive units below the cutting plane of the blades, a part of the crop is released backwards even in a region at the front of the machine, as seen in its direction of forward movement, where the discs are rotating in divergence.

Further objects and advantages of the invention will be set forth in part in the following specification, and in part will be obvious therefrom without being specifically referred to, the same being realized and attained as pointed out in the claims hereof.

Other objects of the invention will in part be obvious, and will in part appear hereinafter.

BRIEF DESCRIPTION OF THE DRAWINGS

For a fuller understanding of the nature and objects of the invention, reference should be had to the following detailed description, taken in connection with the accompanying drawings, in which:

FIG. 1 is a diagrammatic plan view of a machine of the crop mowing type, according to the invention, as seen from above;

FIG. 2 is an elevation view of two blade carriers in a region in which the blade carrier supports are hinged, in accordance with a first embodiment of the invention;

FIG. 3 is a plan view of two blade carriers corresponding to FIG. 2, as seen from above;

FIG. 4 is an elevation view of two blade carriers in the region in which the blade carrier supports are hinged in accordance with a second embodiment of the invention; and FIG. 5 is a plan view of the two blade carriers corresponding to FIG. 4, as seen from above.

DESCRIPTION OF THE PREFERRED EMBODIMENTS

Referring now to the drawings, and particularly to FIG. 1, two blade carrier supports 1 and 2 are fitted at the front of a crop mowing machine 3. To the rear of the supports 1 and 2, there are disposed transmission means, such as a shaft 4, which is made to rotate in a suitable direction, and onto where there are fitted two Archimedean screws 5 and 6 having an opposite pitch. The screws 5 and 6 permit the cut crop to be collected near the center of the machine. The crop is cut by devices on the supports 1 and 2 in order to pass it into the mower, as the mower is moving forward in the direction of the arrow A, so that the crop may additionally be processed by the mower further.

Each support or cutter bar 1 or 2 is fitted with five blade carriers 7, 8, and 9, each of which has the shape of an oval disc. The supports 1 and 2 are connected on their outwardly facing ends to the frame of the machine. To each blade carrier 7, 8, or 9, there are hingedly connected blades 10, which are disposed diametrically opposite one another, and are mounted on the major axis of each blade carrier 7, 8, or 9. A casing 11 is mounted on each blade carrier 7 situated closest to the free end of each bar or support 1 or 2, respectively. Each casing 11 includes drive means, such as a pulley 12, over which a preferably notched belt 13 passes. The belts 13 are driven by pulleys 14, respectively, which in turn are driven by drive units housed in the frame of the machine 3. The drive pulley 12 of each casing 11 transmits its rotating movement to the corresponding blade carrier 7, and causes them to rotate in the direction of the arrows f and f', respectively. The drive means include transmission units, for example, a series of (non-illustrated) gear wheels engaging one another. The blade carriers 8 and 9 may be fitted to at least some shafts of the aforedescribed gear wheels, and these, in turn, drive the blade carriers 8 and 9 in the direction of the arrows f and f'. Each support 1 or 2 is fitted with its own transmission unit, which is driven by a corresponding belt 13, and housed in a frame 15 of the bars or supports 1 or 2.

Since the frame 15 of the bars or supports 1 or 2 extends below the blade carriers 7, 8 and 9, namely below the cutting plane of the mower, the transmission units which are housed in the frame 15 must have as small a thickness as possible, in order not to increase the cutting height of the machine above the ground. These transmission units must, therefore, be of a relatively small size and cannot transmit any appreciable power. This explains the provision of the two cutter bars or supports 1 and 2, the two sets of blade carriers 7, 8 and 9 of which are driven separately on respective lateral ends of the mower.

Moreover, the supports or cutter bars 1 and 2 are hingedly connected at ends opposite to those from which they are driven. As can be seen in FIGS. 2 and 3, the supports or cutter bars 1 and 2 are joined by coupling means, such as units 16 and 17, which are, respectively, made integral with the supports 1 and 2. The units 16 and 17 are hinged to one another around an axle or shaft 18, which extends horizontally in the direction of forward movement A of the machine. Due to the hingeing shaft or axle 18, which, in connection with the units 16 and 17, forms a hinge, one bar or support 1 or 2 can form an angle in relation to the other, in order to allow for any unevenness in the terrain. Moreover, the units 16 and 17 are so dimensioned, that the axles of rotation 19 of neighboring blade carriers 9 disposed, respectively, on each of the two cutter bars or supports 1 and 2, are separated by a distance D, which is greater than the distance d between two neighboring blade carriers 7 and 8, or 8 and 9, respectively, disposed on the same bar or support 1 or 2.

Therefore, it is possible to avoid any collision between neighboring blade carriers 9 disposed, respectively, on different supports or bars 1 and 2, if, as a result of any blocking of the movement of a set of blade carriers 7, 8 or 9 on one of the supports 1 or 2, which may cause one or both belts 13 to slip, the relative position of the set of blade carriers 7, 8 or 9 on one of the supports 1 or 2 is altered in relation to the relative position of the set of blade carriers 7, 8 or 9 on the other support. The relative position of the set of blade carriers 7, 8 or 9 on the two cutter bars or supports 1 or 2 should, in fact, always be maintained as a result of the oval shape of the blade carriers, which facilitates the backward movement of the crop which has been cut, while maintaining a distance e between the blade carriers on a respective bar or support, which is constant, and which is greater than if the blade carriers were circular in shape, but had otherwise the same characteristics as the blade carriers 7, 8 or 9 on which the blades 10 describe a trajectory t as they rotate. The distance or spacing D separating the axes of rotation 19 of neighboring blade carriers 9 disposed on different supports 1 and 2, respectively, also exceeds the distance d between the axes of two neighboring blade carriers 8 and 9, for example, disposed on the same support, but is smaller than the operative cutting diameter c of the circular trajectory t described by each of the blades 10. In this way, only the trajectories t of the blades 10 of neighboring blade carriers 9 overlap, and the formation of any strip of uncut crop between the two supports or cutter bars 1 and 2 is avoided.

In the event of any lack of synchronism in the angular displacement between the sets of blade carriers 9 of the two supports or cutter bars 1 and 2, there occurs only the risk of the blades 10 of the corresponding blade carriers 9 colliding, and this is unavoidable, if it is desired to prevent that a strip of uncut crop be formed between the supports or cutter bars 1 and 2. Since the blades 10 are arranged to pivot on the respective blade carriers 7, 8 and 9, they may retract in a backward direction, as defined with respect to the direction of rotation of the blade carriers. Moreover, any impact of colliding blades 10 is audible, so that the operator can stop the machine, and adjust the angular position of the set of blade carriers 7, 8 and 9 on one of the supports or bars in relation to the angular position of the set of blade carriers on the other supports or bars. This operation can be carried out by rotating the pulley 12 of one of the supports or cutter bars, until the set of blade carriers 7, 8 and 9 on one support again occupies a correct angular position in relation to the set of blade carriers 7, 8 and 9 on the other support. However, if as a result of any collision between the blades 10 of the blade carriers 9, the blades are too badly damaged to continue cutting the crop, their replacement is easy, rapid, simple, and inexpensive.

Since the distance D between neighboring axes of rotation 19 of the blade carriers disposed on the cutter bars or supports 1 and 2, respectively, is greater than the distance d, which separates the axes 19 of a pair of blade carriers 7 and 8, or 8 and 9, respectively, on one and the same support, the front point of intersection p of the trajectories t of the blades 10 on the blade carriers 9, is situated nearer a center line joining all axes of rotation, than the front point of intersection r of neighboring trajectories t of two blades 10 on corresponding blade carriers 7, 8 and 9, on one and the same support; the diameter of each trajectory is equal to the operative cutting diameter of each blade 10.

In order to prevent an accumulation of fragments of crop and/or earth on the front edge of the coupling units 16 and 17, extending up to a first point of intersection p of the trajectories t of the blades 10, the front part of the coupling unit 16 and 17 has been provided with a V-shaped groove with the apex facing backwards, as can be seen from FIGS. 3 and 5. Thus, as seen in the direction of forward movement A of the machine, the front edge 20 of the coupling units 16 and 17 is separated by a distance x, from the first point of intersection p of the trajectory t of the blades 10 of the two blade carriers 9, which separation distance x is similar to the distance y, measured under the same conditions as the distance x, which separates a second point of intersection r of the trajectory t of the blades 10 of a pair of neighboring blade carriers 7 and 8, or 8 and 9, which are situated on one and the same support or cutter bar, from the forward edge 21 of the casing 15 of the corresponding support or bar.

Moreover, the front edge 20 of the coupling units 16 and 17 can, advantageously, be reinforced. When the blade carriers 9 are rotating in a direction opposite to those shown in the drawings, it is possible to straighten out any blades 10 which may have become twisted on encountering an obstacle, such as, for example, a stone.

FIGS. 4 and 5 show another embodiment of the invention, which allows the joined blade carriers 1 and 2 to operate parallel to one another at different respective terrain levels. In this alternate embodiment, the identical parts of which have been provided with the same reference numerals as those described in reference to FIGS. 1 and 2, only the type of connection between the supports 1 and 2 is modified.

Here, there is hingedly connected a coupling member 22 and a coupling member 23, respectively, to the end of each support 1 or 2. The other ends of the coupling members 22 and 23 are each hingeably connected to a shaft or axle 24, which is generally disposed horizontally, and which extends substantially in the direction of forward movement A of the machine. The axles 24 are connected together in a hinged arrangement by means of at least one coupling unit 25. This arrangement allows the hingedly connected supports 1 and 2 to operate at different respective levels, while remaining parallel with one another. The axle or axles 18 and 24 therefore allow the supports 1 and 2 to be hinged to one another. However, without departing from the scope of the invention, the hinged connection between the two supports 1 and 2 may also be replaced by a rigid connection formed, for example, by a plate which secures the two supports 1 and 2 to one another, so that the distance D between the blade carriers 9 is greater than the distance d separating the shafts or axes 19 of a pair of blade carriers 7 and 8, or 8 and 9, respectively, from one another on one and the same support 1 or 2.

Although the present invention has been described only with reference to the joining of two supports 1 or 2, it is equally applicable to a multiple number of supports in excess of two, which may be joined.

Having thus described the invention, what I claim as new and desire to be secured by Letters Patent is as follows:

1. A rotary mower,
  comprising in combination:
  first and second elongated supports extending in a predetermined direction, and facing each other end-to-end,
  a set of substantially oval-shaped blade carriers rotatably mounted on each support about an axis, said blade carriers substantially defining a cutting plane, said axes being substantially disposed at right angles to said cutting plane, two neighboring axes on the same support being separated by a first spacing, two neighboring axes on opposite supports being separated by a second spacing,
  first and second drive means disposed below said cutting plane, and operable to drive each set of elongated blade carriers, respectively, and
  coupling means disposed below said cutting plane connecting said supports to one another, so that said second spacing is greater than said first spacing.

2. A rotary mower as claimed in claim 1, wherein each support has a free end, and wherein said first and second drive means are coupled to said first and second supports near their respective free ends.

3. A rotary mower as claimed in claim 1, further comprising transmission means connecting said first and second drive means.

4. A rotary mower as claimed in claim 1, wherein said coupling means includes at least one hinge.

5. A rotary mower as claimed in claims 1, wherein each blade carrier is adapted to hold a blade, and defining an operative cutting diameter therewith, said second spacing being smaller than said operative cutting diameter.

6. A rotary mower as claimed in claim 1, wherein said coupling means has a front edge, as seen in the direction of forward movement of the mower, said front edge being disposed substantially at right angles to said direction of forward movement, and wherein each blade carrier is adapted to hold a blade, and defining an operative cutting diameter therewith, two neighboring blade carriers disposed on opposite supports defining a first point of intersection of their cutting diameters forwardly of said front edge, and wherein each support has a forward edge as seen in the direction of forward movement of the mower, two neighboring blade carriers disposed on the same support defining a second point of intersection of their cutting diameters forwardly of said forward edge, the distance between said first point of intersection and said front edge being similar to the distance between said second point of intersection and said forward edge.

7. A rotary mower as claimed in claim 1, further comprising at least one shaft disposed in the direction of forward movement of said mower, and wherein said coupling means includes first and second members integral with said first and second supports, respectively, and hingeably connected to said shaft.

8. A rotary mower as claimed in claim 1, further comprising first and second shafts disposed parallel to one another in the direction of forward movement of said mower, and wherein said coupling means includes at least one connecting unit hingeably connected to said first and second shafts.

9. A rotary mower as claimed in claims 1, wherein said supports are flexibly connected to one another, and wherein said coupling means includes at least one connecting unit hingeably connected to said first and second shafts.

10. A rotary mower,
comprising in combination:
at least two elongated supports extending in a predetermined direction in mutual end-to-end relation,
a set of substantially oval-shaped blade carriers mounted on each support for rotation of each blade carrier about an axis, said blade carriers substantially defining a cutting plane, said axes being substantially disposed at right angles to said cutting plane, two neighboring axes on the same support being separated by a first spacing,
a plurality of separate drive means disposed below said cutting plane, and each operable to drive one of said sets of blade carriers, and
coupling means disposed below said cutting plane and so connecting said supports to one another that two neighboring axes on different supports are separated by a second spacing which is greater than said first spacing.

11. A rotary mower as claimed in claim 10 wherein each blade carrier is adapted to hold a blade, and defining an operative cutting diameter therewith, said second spacing being smaller than said operative cutting diameter.

* * * * *